Patented Nov. 18, 1952

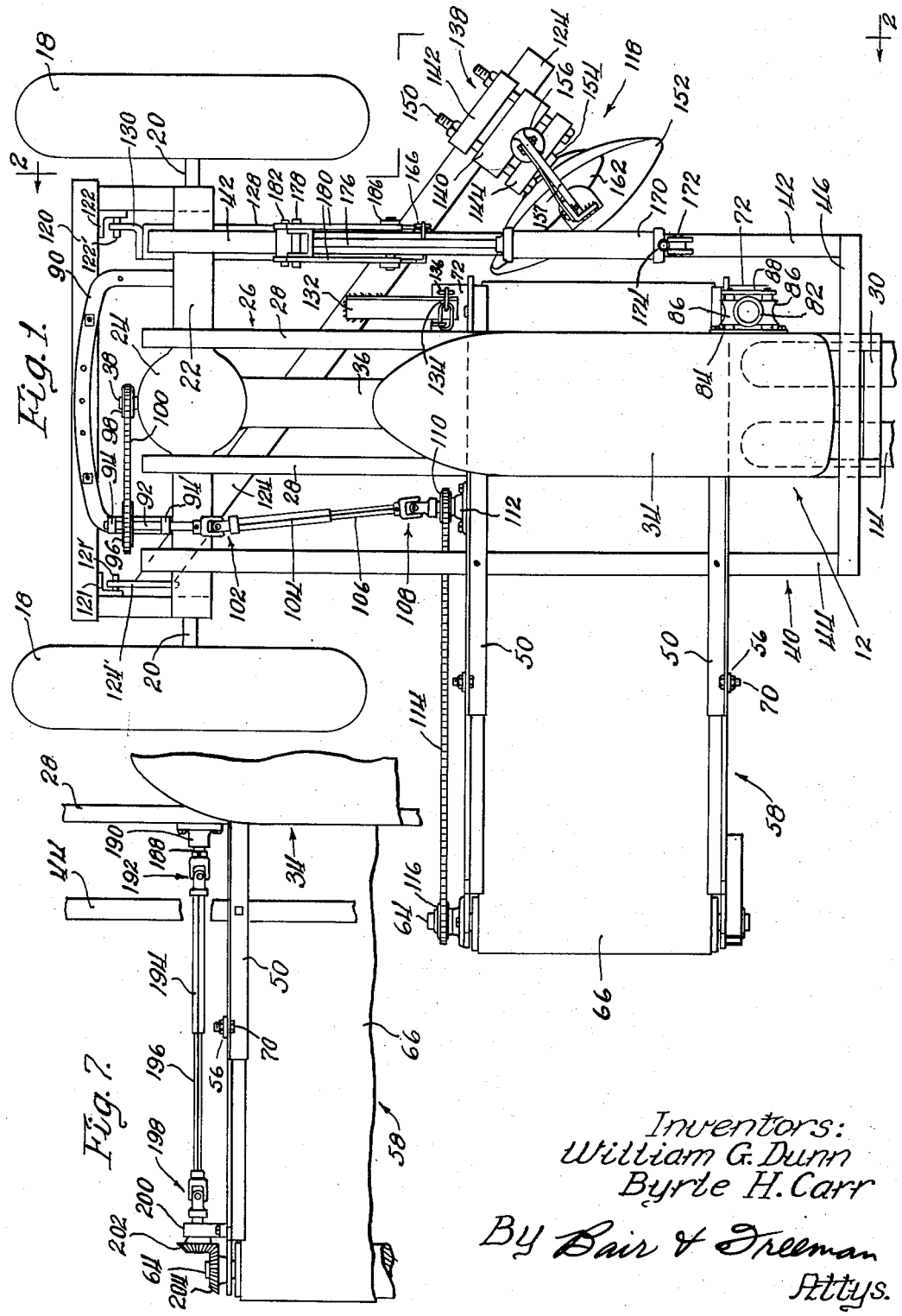

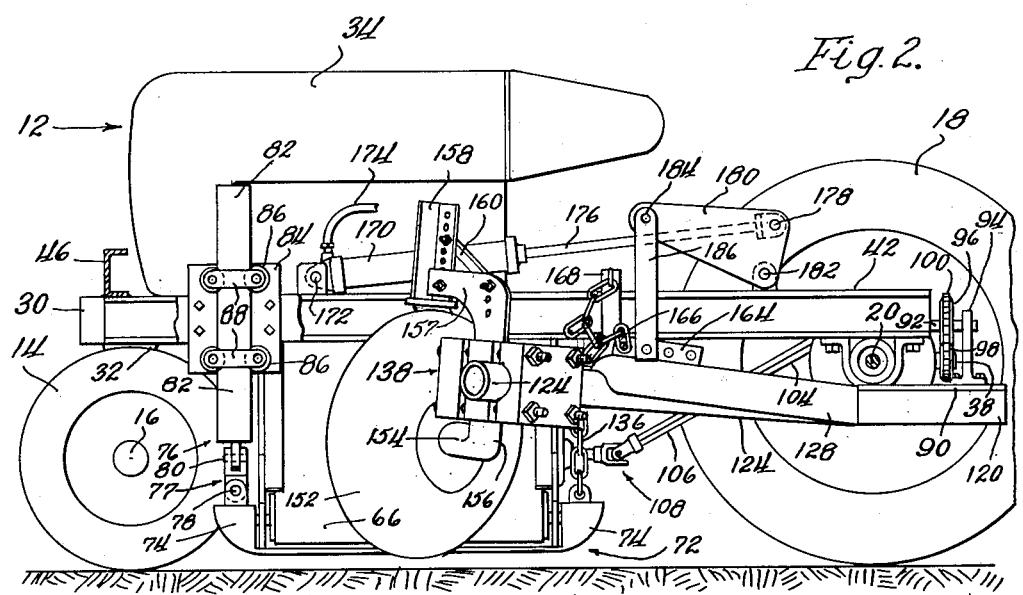

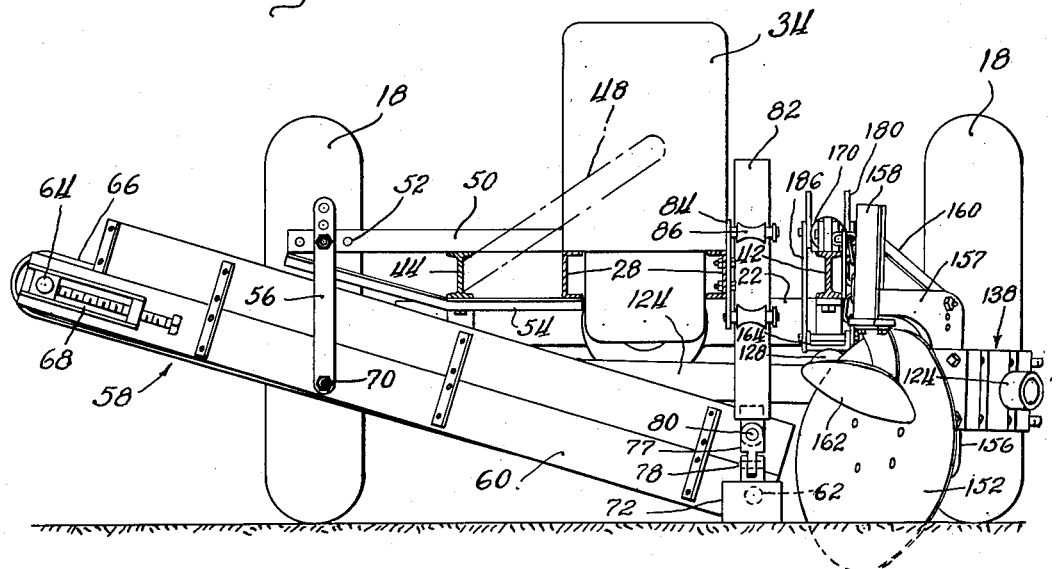
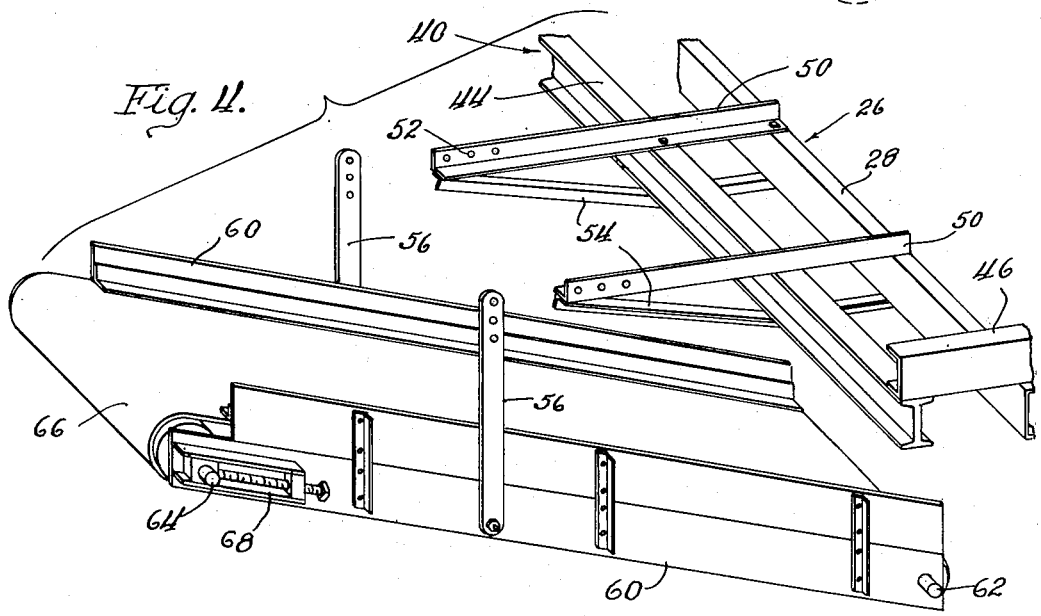

2,618,082

UNITED STATES PATENT OFFICE 2,618,082

EXCAVATING PLOW AND ENDLESS CONVEYER GRADING MACHINE

William G. Dunn and Byrle H. Carr, Clarinda, Iowa

Application May 1, 1948, Serial No. 24,653

3 Claims. (Cl. 37—110)

1

The present invention relates to apparatus adapted, among other things, for excavating slopes for producing contours or terraces.

The present apparatus includes an excavator element for engaging the ground, and an elevator to receive the excavated soil and carry it to the side.

An object of the present invention is the provision of such an apparatus which is adapted to be mounted on and carried by a tractor, as distinguished from a trailing apparatus.

Another object is the provision of such an apparatus which, because of the fact that it is mounted directly on the tractor, is always under the observance of the operator, and responds more readily to guiding movements of the tractor.

Still another object is the provision of such an apparatus which can be readily mounted on a standard tractor and driven by the power take-off mechanism with which the tractor is usually equipped.

Another object is the provision of a novel type of mounting for the apparatus.

A further object of the invention is the provision of novel independent mounting means for each, the excavator element and the elevator.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

Figure 1 is a plan view of a tractor with the apparatus of the present invention mounted thereon;

Figure 2 is a side view taken on line 2—2 of Figure 1;

Figure 3 is a front view, with the front wheels of the tractor omitted;

Figure 4 is an isometric view of the elevator and portion of the auxiliary frame for mounting the elevator;

Figure 5 is an underside view of the excavating element and its supporting frame, taken substantially on line 5—5 of Figure 2;

Figure 6 is an isometric view of the clamp block illustrated in Figure 5; and

Figure 7 is a fragmentary illustration in plan of an alternate arrangement for driving the elevator.

Referring now in detail to the drawings, a tractor as a whole is indicated at 12. It will be understood that the tractor 12 is a standard tractor to which the apparatus of my invention is particularly adapted. For purposes of clarity and

2 simplicity only the essential elements of the tractor are illustrated and the remainder are omitted, since the various parts and their operation are clearly understood by those skilled in the art.

Tractor 12 includes a pair of closely spaced front wheels 14 supported by axle 16, and a pair of rear wheels 18 supported by axle 20. The rear axle 20 is supported in an axle housing 22, extending from the differential housing 24 in the usual manner.

A main tractor frame is indicated at 26 and includes longitudinal members 28 having their rear ends supported in any convenient manner on the axle housing 22, and extending forwardly where they are interconnected by a cross member 30. A spindle 32 extends upwardly from the front axle 16. An engine 34 is mounted on the tractor frame 26 and spindle 32, the engine being illustrated in its simplest form. Extending rearwardly from the engine 34 is a drive shaft housing 36, in which is a drive shaft operably connected with the engine, and with the rear axle 20 through the usual differential. The operation of the tractor thus far described is conventional and need not be described in detail.

The tractor is also supplied with a power take-off shaft 38 extending rearwardly out of the differential housing 24, and is driven by the motive power of the tractor in the usual way. The tractor engine is also supplied with a hydraulic power take-off mechanism which is omitted from the illustration here for convenience. Such hydraulic power take-off mechanism may be of any standard form for purposes of the present invention.

An auxiliary frame is indicated in its entirety by the reference numeral 40 and is applied to the standard tractor for purposes of mounting the mechanism of our invention on the tractor. The auxiliary frame 40 includes side members 42 and 44 positioned at substantially the same height as the main frame 26. The rear ends of the side members 42 and 44 rest on and are supported by the rear axle housing 22 in any convenient manner and extend forwardly to substantially the front end of the main frame 26. The forward ends of the side members 42 and 44 are interconnected by the cross member 46 which rests on the forward ends of the members 28 of the main frame. If desired, a diagonal member 48 may be secured to the front end of the side member 44 to the vertical post provided inside of the radiator grill. The purpose of this diagonal member 48 is to support the substantial load which is placed on the side member 44.

Extending out from the right side of the tractor are horizontal arms 50 which are secured to the adjacent side member 44 and to the respective side member 28 of the main frame. These arms 50 extend laterally outwardly beyond the auxiliary frame member 44 and the outer ends are provided with several holes 52. Reenforcing members 54 interconnect the outer ends of the arms 50 and extend downwardly and under the side member 44 and the main frame and secured thereto.

A pair of links 56 are pivoted at their upper ends in holes 52 and depend downwardly therefrom. The links 56 are for the purpose of supporting the elevator which will be described in detail presently.

The elevator is indicated generally at 58 and includes side vertical plates or members 60. Rotatably mounted in the side plates 60 are shafts 62 and 64 at the respective ends of the elevator. These shafts 62 and 64 are disposed horizontally and provided with rollers over which is trained an endless belt 66. The belt 66, therefore, forms an upper run and a lower run as is conventional in conveyors or elevators of this type. It will be understood, of course, that the side members 60 are suitably interconnected by structural members. An adjustment means 68 is provided for tightening the endless belt 66. A horizontal transverse partition may be provided in the elevator under the upper run of the belt for supporting the load on the upper run.

The elevator 58 is mounted on the tractor so that the lower end of the elevator is disposed under the engine and adjacent the left side of the engine. The lower end is disposed adjacent the ground as will be evident from the various illustrations and it is vertically adjustable as will be explained later. The elevator extends upwardly and laterally of the tractor and is pivoted at 70 in the lower ends of the pivoted links 56. By reason of the arrangement of the links 56, the elevator itself can be pivoted at 70 and the links 56 can pivot in the holes 52, so that the elevator has not only pivotal movement, but also limited longitudinal movement.

The lower end of the elevator 58 is provided with a shoe 72 which is adapted to bear on the ground under certain conditions. The shoe 72 has rounded under surfaces 74 at its forward and rearward ends, with respect to the direction of travel of the tractor.

Connected to the upper side of the front end of the shoe 72 is a guiding means 76 which includes a universal joint 77 having pivots 78 and 80 disposed transversely with respect to each other. Connected to the universal joint 77 is a cylindrical shaft 82 which extends upwardly adjacent the side member 28 of the main frame on the left side of the tractor. A plate 84 is fixedly secured to the main frame by means of bolts or other means. Mounted on the plate 84 are two pairs of rollers 86, the pairs being spaced in vertical alignment, and the rollers in each pair being spaced horizontally. The rollers 86 are pivoted in the plate 84 and the outer ends of the shafts supporting the rollers are interconnected by links 88. The rollers 86 have concave bearing surfaces for engaging the cylindrical surface of the shaft 82, the latter being disposed between the rollers of the pairs. The shaft 82 is of sufficient length to extend upwardly through the upper pair of rollers 86 under all conditions so that the two pairs of rollers retain the shaft 82 in true vertically disposed position, while permitting the shaft to reciprocate vertically therethrough.

A U-shaped draw bar 90 is secured to the rear axle housing 22. The arms of the draw bar extend forwardly and the interconnecting portion extends generally transversely of tractor and is provided with a plurality of holes for connecting trailing implements. Mounted on one of the arms of the draw bar 90 at the right hand side of the tractor is a counter shaft 92, rotatably supported in bearings 94 secured to the draw bar. A sprocket 96 is secured to the counter shaft 92. The sprocket 96 is in driving alignment with another sprocket 98 which is secured to the power take-off shaft 38, and a drive chain 100 is trained over the two sprockets 96 and 98.

The counter shaft 92 extends forwardly a short distance where a universal joint 102 is secured thereto. A sleeve 104 is secured to the universal joint 102 and a shaft 106 is slidably received in the sleeve 104 to form a telescoping shaft. The outer end of the shaft 106 is secured to another universal joint 108. The universal joint 108 is provided with a sprocket 110 and is mounted in a bearing bracket 112 fixedly secured on the elevator 58.

A drive chain 114 is trained over the sprocket 110 and is trained over another sprocket 116 which is mounted on the outwardly extending end of the shaft 64 in the upper end of the elevator. It will thus be apparent that rotation of the power take-off shaft 38 will transmit drive to the shaft 64 which upon rotation will drive the endless belt 66.

It will be understood that the power take-off shaft 38 is under control of the operator of the tractor and is so arranged that it can be connected to and disconnected from the engine of the tractor.

The gear ratio between the power take-off shaft 38 and the shaft 64 in the upper end of the elevator is such that the linear speed of the endless belt in the elevator is greater than the forward speed of the tractor. The purpose of this feature will be referred to later.

For purposes of co-operation with the elevator 58 is what may be referred to as a plow or excavator element, indicated in its entirety at 118. The excavator element 118 is mounted in a special manner as evidenced by the following description: A supplemental drawbar or bracket 120 is disposed on the under side of the drawbar 90 and secured thereto and to the axle housing as by welding or bolting. Angle brackets 121 and 122 are secured in the rear corners of the supplemental drawbar 120 (Figure 1), as illustrated, as by welding or bolting; stub shafts 121' and 122' extend inwardly from the brackets 121 and 122. A diagonal beam or arm 124 has a fitting 124' rockably supported on the stub shaft 121'. The beam 124 extends forwardly and to the left to a position adjacent the lower end of the elevator 58. A brace arm 128 is welded to the beam 124 intermediate the ends of the latter, and extends rearwardly where it is provided with a fitting 130 forming a bearing member and rockably supported on the stub shaft 122'. A lug 132 is welded to the beam 124 and extends to a position above the rear end of the shoe 72 on the lower end of the elevator 58. The lug 132 is provided with a notch 134 for receiving any of the links of a chain 136 which is connected at its lower end to the upper surface of the shoe 72.

The arms 124 and 128 together form a frame which is swingable in a vertical plane parallel with the direction of travel of the tractor. Secured to the outer swinging end of the beam or arm 124 is a universal clamp block 138. The clamp block 138 includes (Figures 1, 5 and 6) a center block element 140 and outer block elements 142 and 144. The block elements 140 and 142 are provided with concave cylindrical mating surfaces 146 and the center block element 140 and the outer block element 144 are similarly provided with mating concave cylindrical surfaces 148. The surfaces 148 are disposed on an axis transverse to the axis of the surfaces 146. The block elements are provided with registering holes through which are inserted bolts 150. The extended or swinging end of the beam 144 is fitted in the concave surfaces 146.

The plow or excavating element 118 includes a disc 152 which is slightly concave. The disc is pivotally mounted on a horizontal portion 154 of a vertically disposed shank 156. The upper end of the shank 156 is turned over at 157 to form a horizontal extension. Secured in the outer end of the horizontal extension 157, and adjustable vertically therein, is a bracket 158 which may also be interconnected by means of a brace 160 with the shank 156. The bracket 158 supports a scraper or deflector blade 162 which is disposed on the concave side of the disc 152 adjacent the upper portion thereof.

The shape and position of the deflector blade 162 is important; the deflector blade positively deflects the soil plowed by the disc onto the elevator belt. The blade 162 is positioned above the center of the disc, and has one end adjacent the periphery of the disc near the elevator, and the other end extending shortly beyond the center in the other direction; moreover the deflector blade is curved with its concave surface facing forwardly at an angle and downwardly.

The shank 156 of the excavator element 118 is clamped in the concave surfaces 148 and when supported by the beam 124, as illustrated in Figures 1 and 5, the shank is disposed substantially vertically. The clamp block 138 can be adjustably rotated on the beam 124 and the shank 156 can be adjustably rotated in the clamp block 138. Similarly, the clamp block 138 can be adjusted longitudinally on the beam 124 and the shank 156 can be adjusted vertically in the clamp block 138. By means of the adjusting features just described the disc 152 can be positioned as desired with relation to the lower end of the elevator, both with respect to proximity to the elevator and angular relation with respect thereto.

A bracket 164 is welded to the reinforcing arm 128 for securement thereto of a link chain 166 or other flexible means; the opposite end of the link chain 166 is received in a notch in a bracket 168 on the side member 42 of the auxiliary frame.

A hydraulic ram 170 is mounted on a side frame member 42 and pivoted at 172 thereon. The hydraulic ram 170 is provided with a hose connection 174 for communication with the hydraulic power take-off mechanism referred to above, and with which the tractor is customarily supplied. The extensible element of the hydraulic ram is pivoted at 178 in a bell crank lever which includes a pair of parallel spaced plates 180. The plates 180 are pivoted at 182 and pivoted at point 184 are depending links 186. The lower ends of the links 186 are pivoted in the bracket 164 on the arm 128.

Figure 7 illustrates the elevator 58 driven by an alternate arrangement. Some tractors are provided with power take-off shafts such as 188 extending laterally out of the side of the engine. Such power take-off shaft 188 in the present instance is journalled in a bearing 190, supported on the member 28 of the main frame. A universal joint 192 is connected to the extended end of the shaft 188, and a square sleeve 194 leads outwardly from the universal joint. A square shaft 196 is telescopically received in the sleeve 194 forming a telescoping shaft. Another universal joint 198 is secured to the outer end of the square shaft 196 and mounted in a bearing mounting 200, secured to the upper end of the elevator 58. A bevel gear 202 having driven connection with the universal joint 198 meshes with another bevel gear 204 secured to the shaft 64 of the elevator. The present instance illustrates the adaptation of the invention to a tractor having a laterally extending power take-off shaft.

Use and operation

The apparatus is used for plowing or excavating contour ditches or terraces on sloping ground. As is well known, water washes directly down the slopes and carries the soil with it. In order to prevent such erosion, the contour ditches or terraces are cut along level lines after the ground is surveyed. The operator of the tractor follows along the line marked by the surveyor and the disc 152 which does the actual plowing or excavating is directly under the observation of the operator of the tractor.

Figure 3 shows the apparatus lowered into operative position where it will be seen that the lower end of the elevator 58 is substantially at the level of the ground, if not actually resting thereon. In this position, the disc 152 of the excavator element cuts into the ground. The forward motion of the tractor causes the disc 152 to roll or rotate in the ground and the diagonal disposition of the disc causes the disc to cut and lift the soil out of the ground. The forward motion of the tractor rotates the disc in a counter-clockwise direction (Figure 2) and as the disc rotates, it carries soil upwardly and tends to throw it onto the elevator; the deflector blade 162, due to its shape and position as above referred to, positively turns all of the soil from the disc and deflects it onto the elevator. The deflector blade can be adjusted vertically with respect to the disc 152 for proper positioning with respect to both the disc and the elevator. The elevator extends laterally out from the tractor and carries the soil from the excavator element and delivers it out of the path of the tractor.

The action of the apparatus is therefore twofold; namely, it cuts a contour ditch which is along a level line and delivers the soil along a line spaced from the contour ditch. The soil thus delivered produces a ridge which has a damming effect similar to the contour ditch itself. The ridge produced by the delivered soil prevents the flow of water therepast. The ridge produced by the delivered soil also may be considered a nearly true contour line and would vary from a true contour line only because of variations in the slope between the contour ditch and the ridge at different points along the line of travel; and because the length of the elevator is not great, and the distance between the ditch and ridge is not great, the variations of the ridge from a true contour line would be negligible.

The chain 166 is utilized for limiting the extent to which the excavator element 118 is lowered and thereby limits the extent to which the disc 152 penetrates the ground. In order to raise the excavator element, the hydraulic ram 170 is actuated, swinging the bell crank plates clockwise, and lifting the beam 124 and thereby the excavator element 118. Since the chain 136 interconnects the lower end of the elevator and the beam 124, the lower end of the elevator is also raised when the beam is raised so that the hydraulic ram 170 is effective for raising both the excavator element and the elevator.

When the lower end of the elevator is raised, the shaft 82 has free sliding movement in the rollers 86. The vertical spacing of the rollers 86 retains the shaft 82 in vertical position and retains the lower end of the elevator against lateral displacement.

When the lower end of the elevator is raised, it is guided by the shaft 82 in the rollers 86 and follows a path which is directly vertical and, therefore, the outer or upper end of the elevator must give way to the right to accommodate this movement. This movement is accommodated by the fact that the elevator is pivoted in the swinging links 56 which permits the elevator to have limited longitudinal movement outwardly from the tractor. The universal joint 77 connecting the shaft 82 and the shoe 72 compensates for the relative movement between the elevator and the shaft 82.

In order that the elevator not be overloaded or become clogged, the linear speed of the endless belt 66 travels faster than the forward speed of the tractor so that all soil which is thrown onto the elevator is carried off faster than it is excavated.

The extensible-contractible feature of the telescoping sleeve 104 and shaft 106 compensates for the various movements of the elevator so that true driving arrangement is produced from the power take-off shaft 38 to the shaft 64 in the elevator. The same is true with the form of drive illustrated in the modification of Figure 7.

Some changes may be made in the construction and arrangement of the parts of our device without departing from the real spirit and purpose of our invention, and it is our intention to cover by our claims any modified forms of structure or use of mechanical equivalents which may be reasonably included within their scope.

We claim as our invention:

1. An excavator grader for mounting on a tractor having front and rear wheels, a main frame and an engine mounted on the main frame in spaced relation to the ground, comprising, in combination, an auxiliary frame mounted on the tractor adjacent said main frame, an elevator mounted on said frames, said elevator having its lower end disposed under the frames and engine adjacent the ground, and its other end extending outwardly from the tractor, said elevator being pivotally mounted for vertical adjustment of its lower end, a beam pivoted on the tractor for swinging in a vertical plane under the engine and extending toward the elevator, an excavator element mounted on said beam and adapted to engage the ground at a position adjacent the elevator, means supporting said beam in vertically adjusted position, means supporting the lower end of the elevator in vertically adjusted position, and means slidably interconnecting the lower end of the elevator and one of the frames for guiding the vertical movements of the elevator in parallelism with the vertical movements of said beam and excavator element.

2. An excavator grader for mounting on a tractor having a main frame and an engine mounted in spaced relation to the ground, comprising, in combination, an auxiliary frame mounted on the tractor adjacent the main frame, arms mounted on said auxiliary frame extending laterally from the tractor, links pivoted on said arms and extending downwardly therefrom, an elevator pivotally supported in the lower ends of said links, the lower end of the elevator extending under the engine and adapted for vertical swinging, means for supporting the lower end of the elevator from the tractor in vertically adjusted positions, a vertically extending shaft connected by a universal joint to the lower end of said elevator, rollers mounted on one of said frames, said rollers being spaced laterally and aligned vertically, said shaft being slidably received between said laterally spaced rollers.

3. An excavator grader comprising a supporting frame, an elevator, said elevator having its lower end disposed adjacent the ground, said elevator being pivotally mounted on said supporting frame and adapted for vertical adjustment of its lower end, a beam pivoted on said supporting frame, said beam extending from its pivot toward the elevator, an excavator element mounted on said beam and adapted to engage the ground at a position adjacent said lower end of the elevator, means for pivoting said beam to vary the height of said excavator element with respect to the ground, means connecting said elevator to said beam, whereby said elevator is pivoted when said beam is pivoted, a guide member on said elevator, guide means on said supporting frame cooperating with said guide member during the pivoting to said beam to guide the vertical movements of the elevator in parallelism with the beam and excavator element, a support shoe on the lower end of the elevator adapted to engage the ground, said support shoe extending across the entire width of the elevator, said means connecting the elevator to the beam attached to one end of said shoe, and said guide member on said elevator being pivoted to the other end of said shoe.

WILLIAM G. DUNN.
BYRLE H. CARR.

REFERENCES CITED

The following references are of record in the file of this patent:

UNITED STATES PATENTS

| Number | Name | Date |
|---|---|---|
| 869,408 | Barnett | Oct. 29, 1907 |
| 1,837,753 | Berry | Dec. 22, 1931 |
| 1,924,054 | Wallace | Aug. 22, 1933 |
| 2,044,315 | McGuire | June 16, 1936 |
| 2,045,387 | Green et al. | June 23, 1936 |
| 2,109,793 | Gustafson | Mar. 1, 1938 |
| 2,109,794 | Gustafson | Mar. 1, 1938 |
| 2,199,239 | Griffith et al. | Apr. 30, 1940 |
| 2,248,709 | Jarmin | July 8, 1941 |
| 2,251,583 | White | Aug. 5, 1941 |
| 2,489,991 | Tucker | Nov. 29, 1949 |
| 2,498,156 | Dodson et al. | Feb. 21, 1950 |